United States Patent
Mifune et al.

(10) Patent No.: US 7,300,345 B2
(45) Date of Patent: Nov. 27, 2007

(54) METHOD AND COMPUTER-READABLE MEDIUM FOR DEPLOYING CHARACTERS IN A GAME

(75) Inventors: Satoshi Mifune, Tokyo (JP); Yutaka Ito, Tokyo (JP)

(73) Assignee: Kabushiki Kaisha Sega, Tokyo (JP)

( * ) Notice: Subject to any disclaimer, the term of this patent is extended or adjusted under 35 U.S.C. 154(b) by 638 days.

(21) Appl. No.: 10/262,948

(22) Filed: Oct. 3, 2002

(65) Prior Publication Data

US 2003/0083128 A1    May 1, 2003

(30) Foreign Application Priority Data

Oct. 11, 2001 (JP) ............... 2001-314599

(51) Int. Cl.
- A63F 9/24 (2006.01)
- A63F 13/00 (2006.01)
- G06F 17/00 (2006.01)
- G06F 19/00 (2006.01)

(52) U.S. Cl. .............. 463/4; 463/9; 463/23; 463/30; 463/31; 463/32; 463/33; 463/34

(58) Field of Classification Search .......... 463/4, 463/31
See application file for complete search history.

(56) References Cited

U.S. PATENT DOCUMENTS

| | | | |
|---|---|---|---|
| 5,863,248 A * | 1/1999 | Mine et al. ............ 463/4 |
| 5,933,148 A | 8/1999 | Oka et al. |
| 6,071,002 A * | 6/2000 | Katayama ............ 434/257 |
| 6,152,821 A * | 11/2000 | Nakagawa et al. ...... 463/4 |
| 6,168,519 B1 * | 1/2001 | Nakagawa et al. ...... 463/4 |
| 6,270,433 B1 * | 8/2001 | Orenstein et al. ...... 473/167 |
| 6,431,982 B2 * | 8/2002 | Kobayashi ............ 463/4 |
| 6,676,518 B1 * | 1/2004 | Sawa et al. ............ 463/31 |
| 6,829,747 B1 | 12/2004 | Kato et al. |

(Continued)

FOREIGN PATENT DOCUMENTS

EP    0 962 891 A2    12/1999

(Continued)

OTHER PUBLICATIONS

Fifa 2000 for SONY PLAYSTATION: Game Manual. Fifa 2000 released Nov. 30, 1999. Scanned copy. [online] [retrieved May 3, 2006] Retrieved from The Game Manual Archive <URL:http://www.gamemanuals.net/>. Attaching Print Out (10 pages).*

(Continued)

*Primary Examiner*—Robert Pezzuto
*Assistant Examiner*—Milap Shah
(74) *Attorney, Agent, or Firm*—Finnegan, Henderson, Farabow, Garrett & Dunner, L.L.P.

(57) ABSTRACT

An object of the present invention is to deploy soccer players in optimum positions in a soccer game. As means for achieving this object, a base position and ability parameters of player characters are stored in memory as attribute data. Player character/formation selection means obtain an operating signal from a controller and thereby obtain player character and formation information. Player character deployment means reference the attribute data to determine the optimum positions for the player characters on a soccer field. Game execution means execute the game on the basis of the determined positions.

4 Claims, 6 Drawing Sheets

U.S. PATENT DOCUMENTS

2003/0049590 A1* 3/2003 Feldbau ............... 434/251

FOREIGN PATENT DOCUMENTS

| EP | 976 432 A1 | 2/2000 |
| EP | 1 016 437 A1 | 7/2000 |
| JP | 10-211361 | 8/1998 |
| JP | 10-215452 A | 8/1998 |
| JP | 11-342266 | 12/1999 |

OTHER PUBLICATIONS

Partial European Search Report issued by EPO for European Application No. EP 02 25 7023, dated Nov. 4, 2004.

Trulsen et al., "championship Manager Season," Games Domain Review (Nov. 1997).

CHOWN, "Premier Manager 3," Games Domain Review (Apr. 1995).

Notice of Reasons for Refusal issued by Japanese Patent Office for Japanese application No. 2001-314599, mailing date Aug. 26, 2005.

Konami Official Guide Perfect Series, J-Leagui—LIVE—Winning Eleven 2001, Perfect Guide, First Edition, Konami Corporation, Aug. 29, 2001, pp. 14-22.

Konami Official Guide Perfect Series, J-League Pocket—Perfect Guide, First Edition, Konami Corporation, Jun. 17, 2001, First Edition, pp. 34-35.

Notice of Reasons for Refusal, Japanese Patent Office, Dec. 12, 2005.

Notification of First Office Action, Chinese Patent Office, Jan. 20, 2006 (9 pages).

* cited by examiner

| FW | FW1<br>RIGHT<br>60 | FW2<br>LEFT<br>70 | | |
|---|---|---|---|---|
| MF | MF1<br>RIGHT<br>45 | MF2<br>RIGHT<br>80 | MF3<br>RIGHT<br>75 | MF4<br>LEFT<br>65 |
| DF | DF1<br>RIGHT<br>90 | DF2<br>RIGHT<br>95 | DF3<br>RIGHT<br>70 | DF4<br>RIGHT<br>65 |

FIG.6

| FW | FW1<br>RIGHT<br>60 | FW2<br>LEFT<br>70 | MF1<br>RIGHT<br>45 | |
|---|---|---|---|---|
| MF | MF2<br>RIGHT<br>80 | MF3<br>RIGHT<br>75 | MF4<br>LEFT<br>65 | DF4<br>RIGHT<br>65 |
| DF | DF1<br>RIGHT<br>90 | DF2<br>RIGHT<br>95 | DF3<br>RIGHT<br>70 | |

FIG.7

| FW | FW2<br>LEFT<br>70 | FW1<br>RIGHT<br>60 | MF1<br>RIGHT<br>45 | |
|---|---|---|---|---|
| MF | MF4<br>LEFT<br>65 | MF2<br>RIGHT<br>80 | MF3<br>RIGHT<br>75 | DF4<br>RIGHT<br>65 |
| DF | DF1<br>RIGHT<br>90 | DF2<br>RIGHT<br>95 | DF3<br>RIGHT<br>70 | |

| SELECTOR ENTRY EDIT | | | |
|---|---|---|---|
| REGISTERED COUNTRIES | CREATED EDIT DATA | | |
| AUSTRALIA | AUSTRALIA | | HUNGARY |
| BULGARIA | | | 6. BUKONFUCHELICH |
| | | | 22. SHULITA |
| FRANCE | FRANCE 1 | | 13. OBARAMUVICH |
| ITALY | ITALY 1 | ITALY 2 | 17. JENVICH |
| | | | 16. OSHICH |
| SPAIN | SPAIN 1 | SAPIN 2 | 2. KOLLICH |
| YUGOSLAVIA | | | 11. OUTAKUCH |
| | | | 9. HITAOCH |
| HUNGARY | HUNGARY 1 | HUNGARY 2 | 24. FUJITAKENKOLLICH |
| CROATIA | | | 18. STAEKUVICH |
| | | | 20. KOHAKONAVICH |

METHOD AND COMPUTER-READABLE MEDIUM FOR DEPLOYING CHARACTERS IN A GAME

BACKGROUND OF THE INVENTION

1. Field of the Invention

The present invention relates to technology for the optimum deployment of characters on a field which is formed in a video game space, data management technology for team data, and technology for forming a model using a montage.

2. Description of the Related Art

In competitive team sports such as soccer, each player is provided with a role (position), and by modifying these positions into arrays (formations) laid out in predetermined configurations, the positions are made to correspond to the conditions of a match. In soccer, there are formations such as a 4-4-2 formation, which lays emphasis upon defense by deploying 4 defenders (DF) at the rear, 4 midfielders (MF) in midfield, and two forwards (FW) up-front, or a 3-4-3 formation which lays emphasis upon attack by deploying 3 DFs at the rear, 4 MFs in midfield, and 3 FWs up-front. These formations are selected according to the opponent, the aptitude of the players on the team, the match plan and so on.

Among conventional soccer video games simulating the real sport, there have been disclosed games with a system for such formations which can be set by a game player. In the setting method of the formation system in a conventional soccer game, first the player characters who are to take part in a match and the formation of the players are selected, after which setting is performed for each player character to determine which player will be deployed in each of the positions laid out in accordance with the selected formation. According to this method, however, the game player must set all of the positions for a maximum of 11 players (in the case of a soccer game) manually, which is complicated.

In order to solve such a problem, a so-called automatic deployment system is known, this system being constituted such that the positions in each formation and each individual player character are allotted corresponding internal reference numbers such that when a player character and a formation are selected, the reference numbers of the selected player characters and the reference numbers of the positions in each formation are referenced in order to deploy each player character in positions on the field corresponding to the respective positions in the selected formation. In this automatic deployment system, the base position of each player character is noted, and player numbers are allocated to player characters for each of the respective positions. For example, player numbers FW1 to FWn are allocated to n number of FW player characters, player numbers MF1 to MFm are allotted to m number of MF player characters, and player numbers DF1 to DFk are allocated to k number of DF player characters. Reference numbers are also allocated to each position in each of the formations. For example, the position numbers F1 to Fp are allocated to the FW positions, M1 to Mq are allocated to the MF positions, and D1 to Dr are allocated to the DF positions. Here, p+q+r=10.

Then, when the game player selects the player characters who are to take part in the match and the formation, the player numbers and position numbers are referenced, whereby the player characters are automatically deployed in the desired positions. When, for example, a game player selects FW1 and FW3, MF1, MF2, MF4 and MF6, DF1, DF2, DF3 and DF5 as player characters and selects a 4-4-2 formation as the match array, the player characters are deployed in order of player number in the position with the smallest number onward, such that player character FW1 is deployed in position F1, player character FW3 is deployed in position F2, player character MF1 is deployed in position M1, and so on.

However, in a conventional automatic deployment system, the deployment of the player characters in each position consists of nothing more than simply deploying the player characters in order of player number in the position with the smallest number onward. Thus, player deployment is performed in a manner inconceivable in real soccer, without consideration of the abilities and aptitude of the individual player characters. This may cause the game player to lose interest. To explain according to the aforementioned example, if MF6 is right-footed, then the right foot ought to be used to hit a back pass accurately toward the center of the field, and therefore a position on the right side of the field, in other words M1 or M2, is desirable. However, according to the aforementioned example, MF1, MF2 and MF4 are deployed in positions M1 through M3, and therefore MF6 is deployed in position M4 on the left side of the field and is unable to exploit his abilities.

This kind of problem becomes even worse when the number of player characters selected differs from the number of positions established for each formation since proper deployment cannot be conducted. For example, if a 4-3-3 formation is selected as the match array, regardless of the player characters selected as above, a situation arises in which 1 FW is lacking and 1 MF is lacking, and therefore 1 MF must move to an FW position. It is desirable to move an MF player character who possesses good attacking ability and judgment ability as an FW to the FW position, but since the conventional automatic deployment system does not take into consideration the base positions, ability values, dominant feet and so forth of the individual player characters, positioning is carried out simply on the basis of a reference number. As a result, inappropriate positioning, such as deploying the MF with the lowest number as an FW, is carried out without due consideration.

Furthermore, even if the number of selected player characters correctly corresponds to the formation system, the number of player characters to be deployed in each of the positions will change if the formation system is modified, and thus the same problem will arise. In any case, it is necessary for the game player to perform a manual resetting operation in order to deploy the players in more suitable positions, but complicated to do so. In order to avoid these problems, a further method has been considered in which ideal player deployments in all of the formations are preset in respect of all of the player characters in all of the teams that are set in the game system. However, since this would expand the amount of data, it is unrealistic.

A conventional soccer game has also been disclosed in which the team formation, starting members, the personal appearance, names, base positions, ability values and so on of the player characters can be created using an editing mode. However, since the edited data are set so as to be overwritten in succession onto the same file, editing cannot be performed easily. Further, saving a plurality of edited data created by the game player so as to be usable has not been considered.

A conventional soccer game has also been disclosed in which polygons (parts) constituting a part of the faces of the player characters, such as the eyes, nose, and mouth, are assembled so as to create a favored face by means of a montage system, whereupon these faces are morphed to create various facial expressions. However, in a conventional montage, the magnitudes, shapes and so on of the polygons are preset, and therefore couplings among polygons are limited, making it difficult to create an individual face with a small amount of data. Moreover, when an attempt is made to render a moving facial expression by shifting the vertex of each polygon to fix an expression on a face, the degree of freedom is small, and it is therefore difficult to render richly expressive faces. Furthermore, if one considers that in the case of a soccer game, there are as many as 60 teams entering tournament games, league games and so on, and approximately 20 player characters per team, the total is near 1200 player characters, and thus the amount of polygon data expands. It is therefore necessary to develop technology for creating a large number of richly expressive faces with a small amount of data.

It is therefore an object of the present invention to disclose technology for a competitive team sports game which enables the positioning of player characters on a field to be determined on the basis of the attributes and abilities of the individual player characters. It is also an object of the present invention to disclose technology for a competitive team sports game which ameliorates the creation, inspection and so on of edit data for a team. It is a further object of the present invention to disclose technology for creating expressive objects using a small amount of data.

SUMMARY OF THE INVENTION

In order to solve the aforementioned problems, a character deployment method of the present invention is a method of determining the positioning of each of a plurality of characters who take part in a game in which these characters assume a role corresponding to a position on a field, wherein the positions of the characters are determined on the basis of the base position of the characters on the field and ability parameters which evaluate the abilities of the characters. In this manner, positioning based on the abilities of the characters becomes possible.

Further, a data management method of the present invention is a method of managing edit data for a team constituted by a plurality of characters, wherein each set of edit data created by a game player is saved on a separate file for each team. Thus, edit data are not overwritten onto the same file, as in the related art, and therefore edit operations can be performed with ease.

Further, a model formation method of the present invention is a method of forming a desired model by assembling a plurality of polygons, wherein the model is formed by assembling the polygons on the basis of vertex connection information for mutually adjacent polygons. According to this technique, even when the magnitudes and shapes of the polygons do not conform with each other, the vertex connection information for the polygons can be used to enlarge/reduce the polygons, whereby the magnitudes and shapes of the polygons can be aligned.

Also in the present invention, a program for causing a computer system to execute the aforementioned methods can be recorded on a computer-readable recording medium. Transportable recording media and the like such as memory cartridges comprising, for example, optical recording media (recording media which are capable of reading data optically such as CD-RAM, CD-ROM, DVD-RAM, DVD-ROM, DVD-R, PD disk, MD disk, or MO disk), magnetic recording media (recording media which are capable of reading data magnetically such as a flexible disk, magnetic card, or magnetic tape), or memory devices (semiconductor memory devices such as DRAM or ferroelectric memory devices such as FRAM), maybe used as such recording media.

Further, this program may be distributed on demand from a network server such as a Web server in response to a request from a client device (a personal computer, game device, or alternatively a portable information terminal or the like such as a portable telephone installed with a Web browser, PDA, or a palm-held PC) which is connected to an open network such as the Internet or a packet telecommunication net.

DESCRIPTION OF THE PREFERRED EMBODIMENTS

An embodiment of the present invention will be explained below with reference to each of the drawings.

Figure 1:
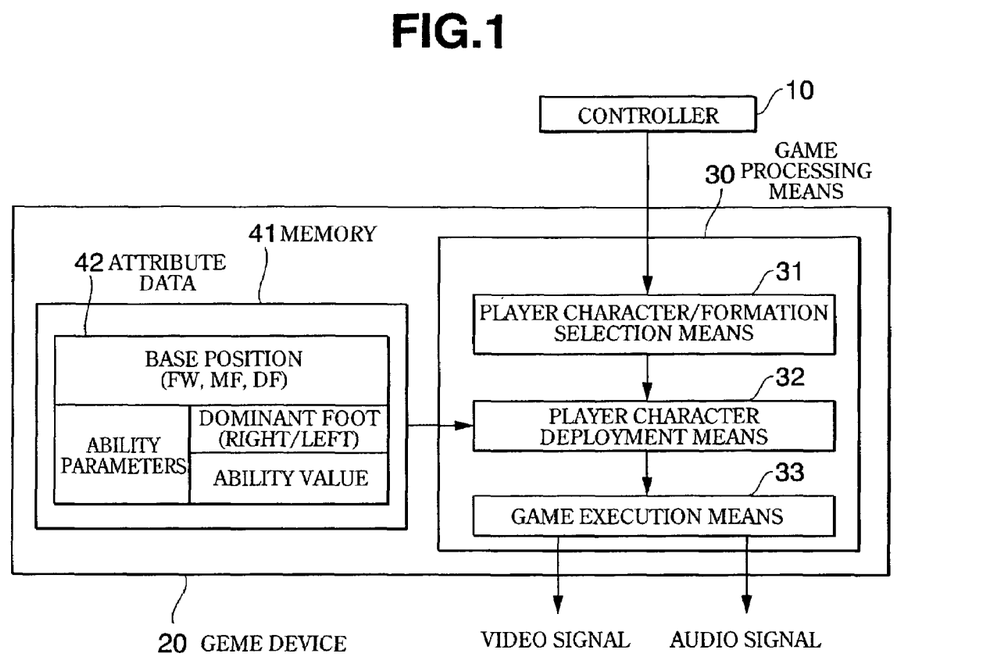
FIG. 1 is a block diagram of the functions of a game device.

FIG. 1 is a block diagram of a game device of this embodiment. In the figure, the symbol 30 indicates game processing means which are activated by the cooperation between software and hardware resources resulting from the execution of a game program on an operating system, and which include player character/formation selection means 31, player character deployment means 32 and game execution means 33. The game processing means 30 incorporate operating information inputted by a game player through a controller 10, perform various types of processing required in the game, and create video signals for generating a game screen and audio signals for outputting sound effects and BGM.

Attribute data 42 for the player characters are stored in memory 41. The base position (divided into FW, MF, DF) and ability parameters of the player characters are included in attribute data 42. The ability parameters are parameters for defining the abilities of the player characters, including whether a player character is left-footed or right-footed, and also include an ability value for the corresponding position. The ability value is a value in which, if a player character is an FW for example, the aptitude of the player character as an FW is quantified as a numerical value, and in this case would indicate an evaluation of general athletic ability with a predominant emphasis upon attacking skills such as scoring success rate, leg speed, dribbling skill, and judgment ability when near the goal. Similarly, in the case of a DF, the ability value is a value indicating an evaluation of general athletic ability with an emphasis placed on defending skills.

The game player selects the player characters who are to take part in the match and the team formation while referring to a guidance screen which is displayed on a video monitor. All of the player characters who are capable of participating in a match and all of the possible formations (4-3-3, 2-4-4, 3-4-3 etc.) are displayed on the video monitor. The player character/formation selection means 31 obtain the operating information from the game player and output the information about the player characters and formation selected by the game player to the player character deployment means 32. The player character deployment means 32 read the attribute data from the memory 41 and perform positioning of the player characters in consideration of the base positions, dominant feet and ability values of the player characters. Once the positioning is determined, the game execution means 33 execute the soccer game on the basis of the determined positioning information.

Figure 4:
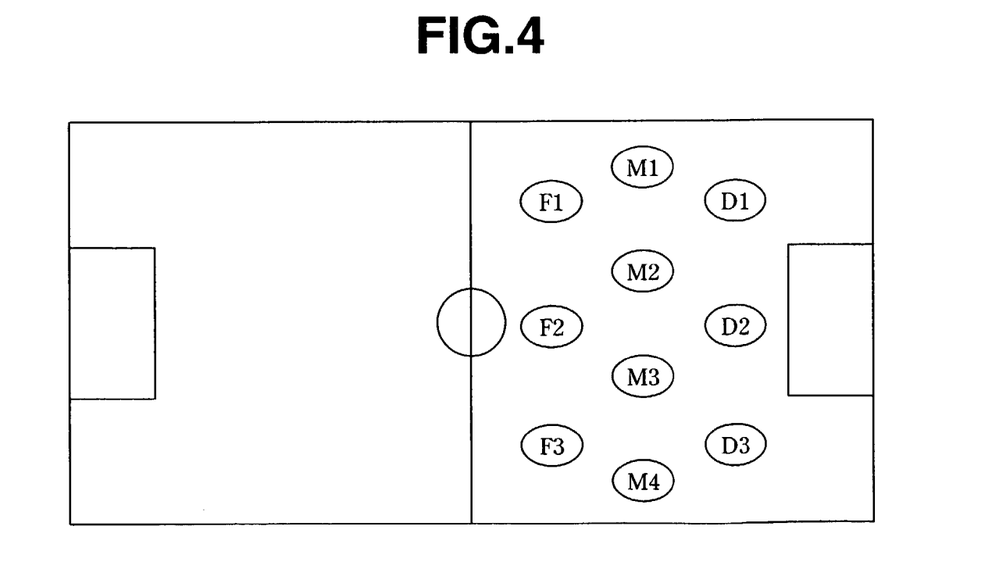
FIG. 4 is a view explaining position numbers on a soccer field.
Figure 5:
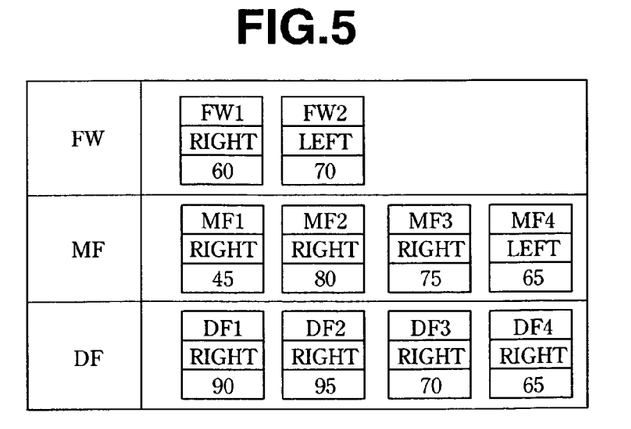
FIG. 5 is a view explaining the positioning of the player characters.

The procedure for player character positioning, which is performed by the player character deployment means 32, will now be explained in detail with reference to FIGS. 3 through 7. FIG. 4 is an exemplification of the position numbers (F1 through F3, M1 through M4, and D1 through D3) allocated to each position in a 3-4-3 formation. As is illustrated in the figure, the numbers are allocated sequentially so as to grow larger from the right side to the left side of the field. As is illustrated in FIG. 5, the game player selects FW1 and FW2 as FWs, MF1, MF2, MF3, and MF4 as MFs, and DF1, DF2, DF3, and DF4 as DFs in the aforementioned formation. Here, in the figure, the "right" of FW1 indicates that this player character is right-footed, and "60" indicates that the ability value of FW1 as a forward is 60. Likewise, the "left" of MF4 indicates that MF4 is left-footed, and the "65" indicates that MF4 has an ability value as an MF of 65. The same applies for the other player characters.

Figure 6:
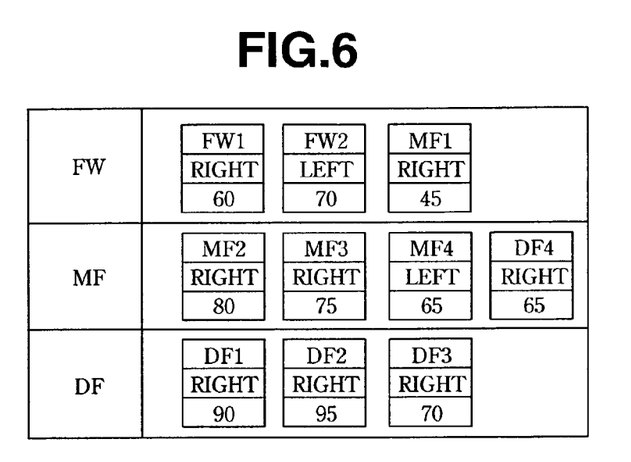
FIG. 6 is a view explaining the positioning of the player characters.
Figure 7:
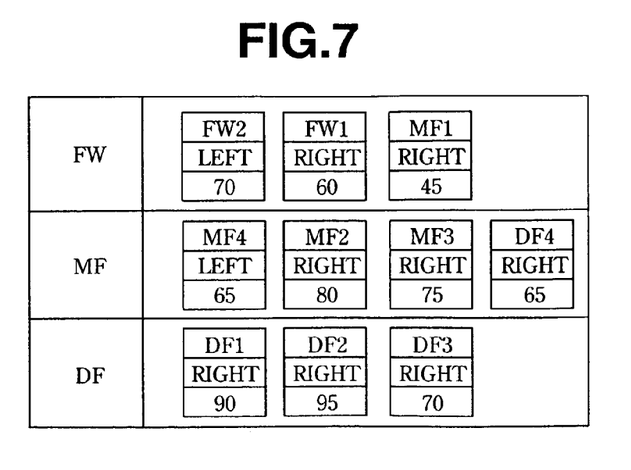
FIG. 7 is a view explaining the positioning of the player characters.

The player characters selected by the game player in this manner include 2 FWs, 4 MFs, and 4 DFs, and therefore a 3-4-3 formation cannot be constructed. In order to construct this formation with 3 FWs, 4 MFs and 3 DFs, one player character must be moved from MF to FW and one player character must also be moved from DF to MF. Thus, the player character deployment means 32 elect the player characters with the lowest ability values in each of the positions as candidates. In the example in the figure, MF1 has an ability value of "45", which is the lowest in MF, and therefore, as is shown in FIG. 6, MF1 is moved to FW. DF4 has an ability value of "65", which is the lowest ability value in DF, and hence DF4 is moved to MF. As a result, the player characters are deployed in each of the positions as is shown in FIG. 6 such that a formation of 3 FWs, 4 MFs and 3 DFs can be constructed.

Next, player character deployment switching is conducted for each of the positions based on the dominant foot information in order to deploy the right-footed player characters on the right side of the field and left-footed player characters on the left side of the field. Among the FWs in the aforementioned example, FW2 is left-footed and therefore FW2 is deployed on the left wing (F3 in FIG. 4), whereby FW1 and MF1 are subsequently deployed in the center (F2 in FIG. 4) and on the right wing (F1 in FIG. 4) respectively. Player character deployment switching is conducted in a similar manner for each position in MF and DF, based on the dominant foot information. As a result, the final positioning of the player characters is set to that shown in FIG. 7.

Figure 3:
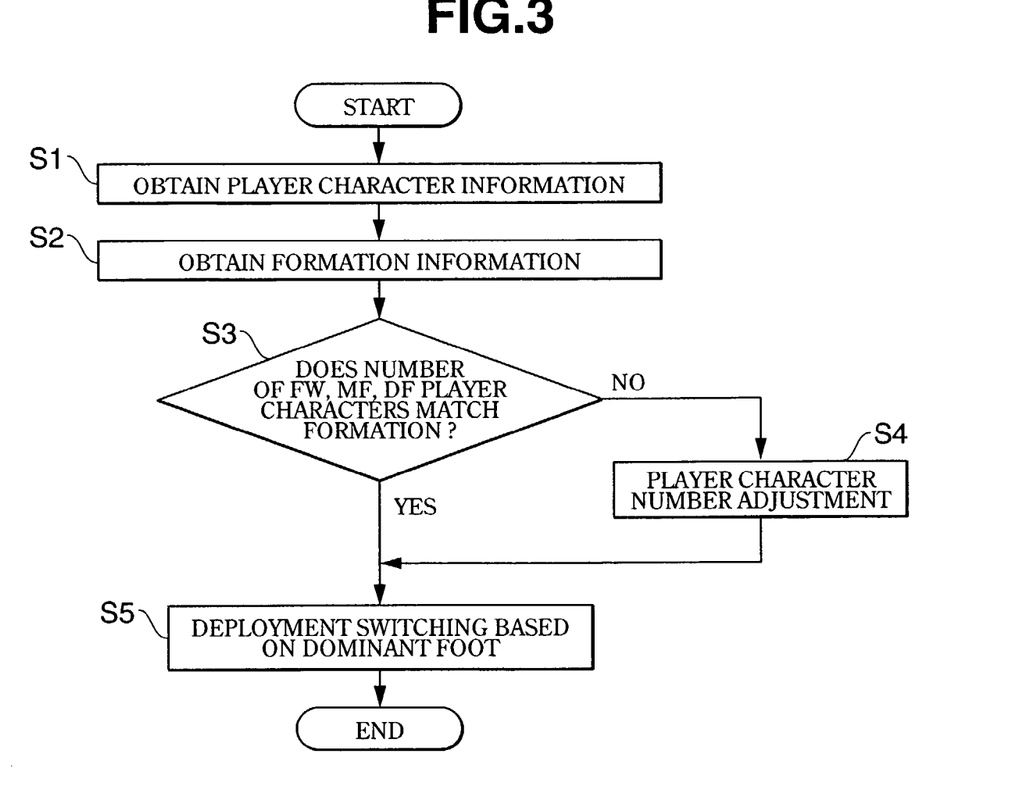
FIG. 3 is a flowchart describing a procedure for determining the positioning of player characters.

FIG. 3 describes in detail the procedure for the positioning of the player characters. When the player character deployment means 32 obtain the player character information and formation information from the player character/formation selection means 31 (S1, S2), a judgment is made as to whether or not the number of characters selected for each position by the game player matches the number of players in each position in the formation (S3). Here, if the numbers of characters for each position do not match (S3; NO), adjustment thereof is performed as described above, referring to the ability values of the player characters (S4). On the other hand, if the numbers of characters for each position match (S3; YES) or following the adjustment in processing step S4, deployment switching of the player characters is conducted on the basis of the dominant foot information (S5).

Thus, according to this embodiment, positioning is performed with reference to the ability parameters of the player characters, and therefore inappropriate positioning such as that in the related art is not conducted, but rather positioning based on a proper evaluation of the abilities of the individual player characters can be performed. Furthermore, there is no need for ideal positioning to be preset for all of the formations in respect of all of the player characters on all of the teams, and as a result inadvertent increases in the amount of data do not occur.

Figure 2:
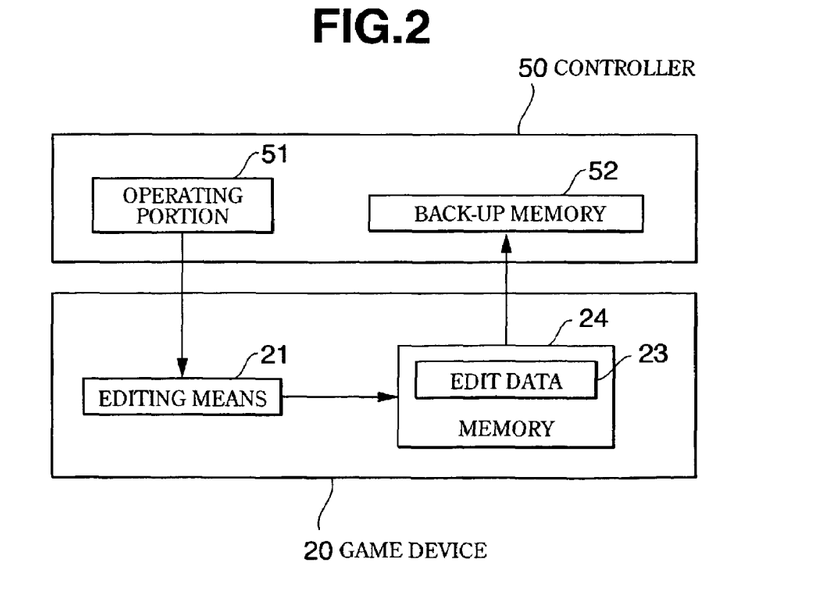
FIG. 2 is a block diagram of the functions of a game device.

Soccer team data editing will now be explained. FIG. 2 is a block diagram of the functions of a game device. The game player operates an operating portion 51 provided on a controller 50 to edit the team formation, starting members, and the personal appearances, names, base positions, ability values and so on of the player characters in editing mode, whereby editing means 21 obtain an operating signal outputted from the operating portion 51 to create edit data 23. These edit data 23 are not overwritten onto the same file but rather stored in memory 22. The edit data 23 can be transferred to back-up memory 52 inside the controller 50 according to necessity.

Figure 8:
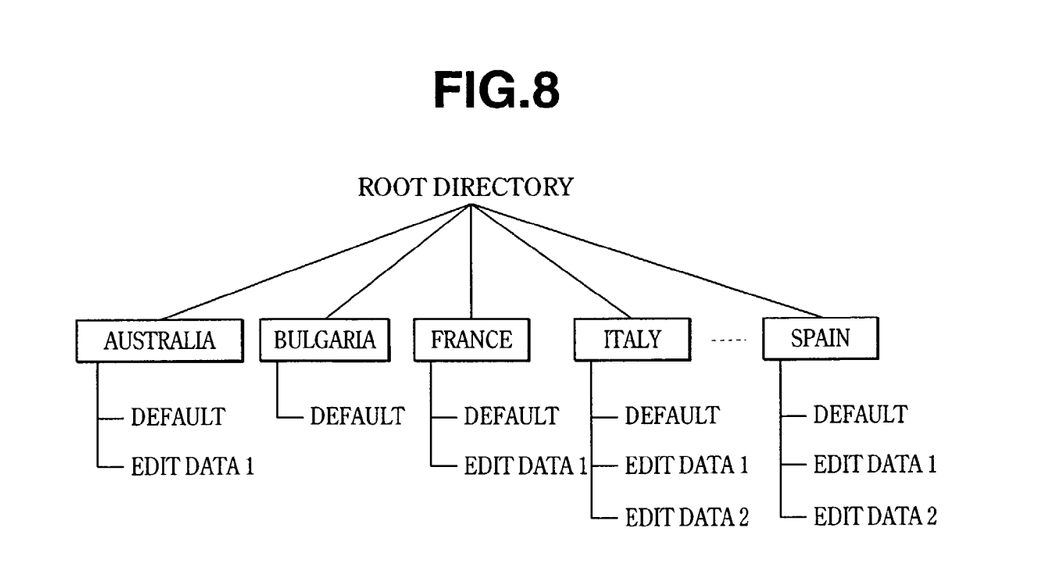
FIG. 8 is a view explaining the structure of an edit data directory.

FIG. 8 illustrates the structure of a directory for the edit data 23. Sub-directories of an Australian team, a Bulgarian team, a French team, an Italian team, . . . , and a Spanish team are positioned under the root directory. These sub-directories are for storing the data edited by the game player for each team, and a default value, edit data 1, edit data 2 and so on are stored according to the editing history of the game player. The default value indicates default-set team data, and edit data n indicates the nth set of edit data.

Figure 9:
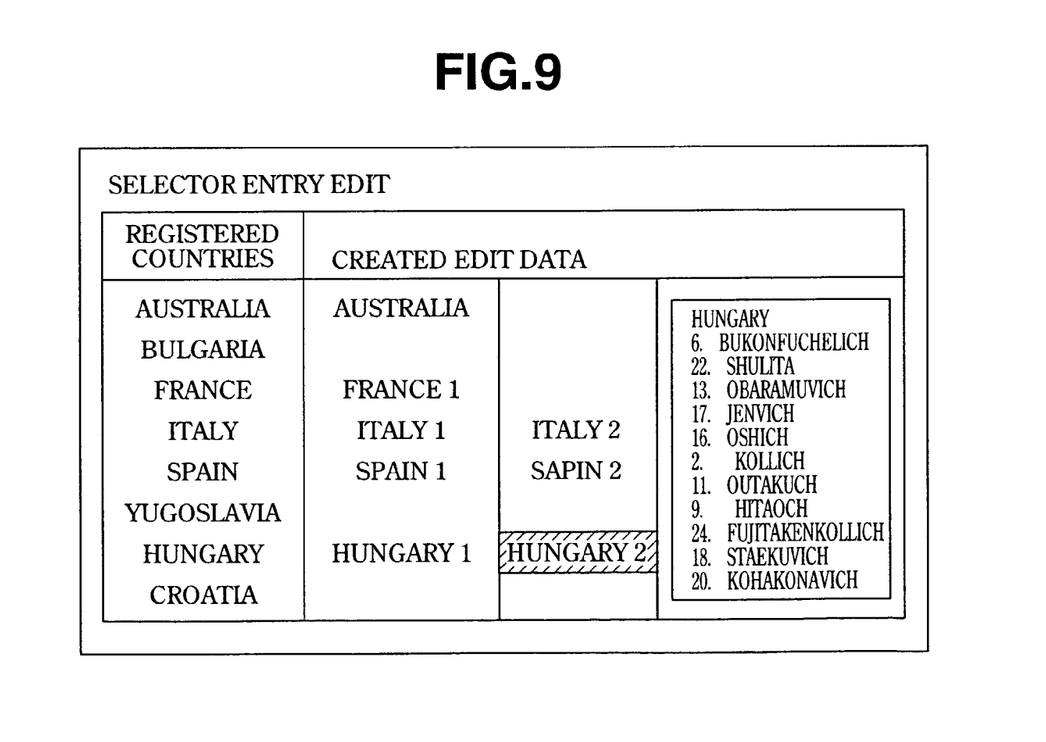
FIG. 9 shows a team data editing screen.

FIG. 9 shows one example of a team data editing screen. In the figure, "registered countries" indicates the default-set team data, and created edit data signifies edit data. For example, "Hungary 1" is the first set of edit data for the Hungarian team, whereas "Hungary 2" is the second set of edit data for the Hungarian team. In the figure, the starting members for "Hungary 2" are displayed. In this embodiment, deletion, modification and copying of edit data can be performed on one editing screen, and inspection and the like of each set of edit data is also easy. Match records and so on of the teams can also be displayed on the same screen.

Thus, according to this embodiment, edit data for team data is not stored by overwriting, as in the related art, but rather is saved on separate files. Hence edit data can be created with ease and editing operations of edit data such as deletion, modification, and copying can be centralized.

Figure 10:
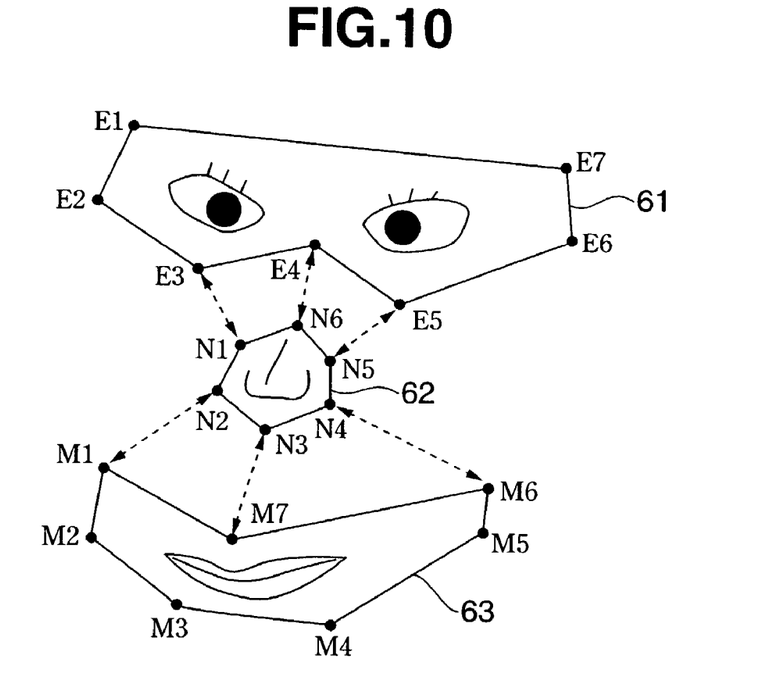
FIG. 10 is a view explaining model formation.
Figure 11:
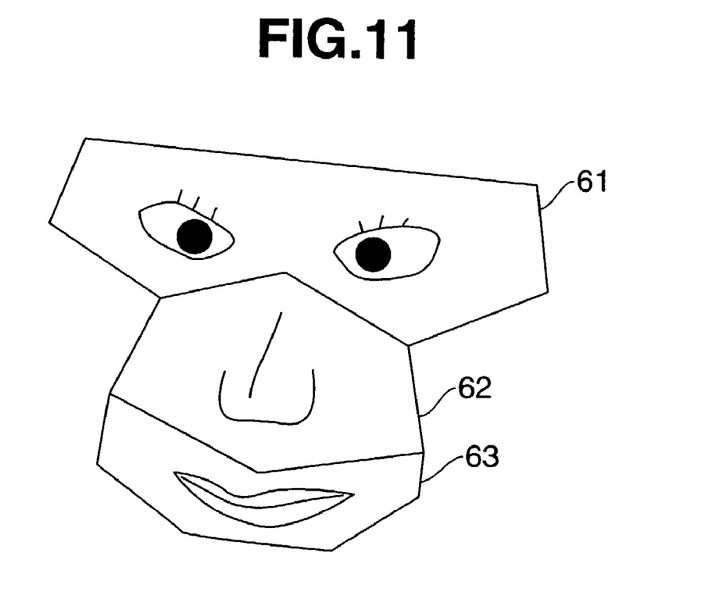
FIG. 11 is a view explaining model formation.
Figure 12:
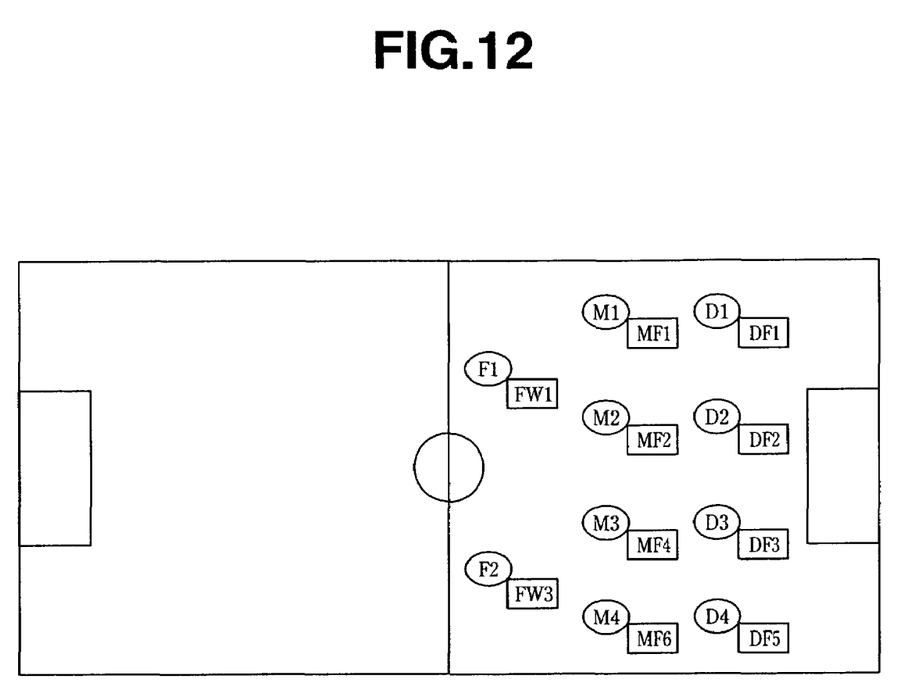
FIG. 12 is a view explaining positioning on a soccer field.

A technique for creating the face of a player character using a montage will now be explained with reference to FIGS. 10 and 11. In the figures, the symbol 61 indicates a heptagonal polygon constituting the parts of the eyes and the sections on the periphery thereof, the symbol 62 indicates a hexagonal polygon constituting the parts of the nose and the peripheral sections thereof, and the symbol 63 indicates a heptagonal polygon constituting the parts of the mouth and the peripheral sections thereof. The magnitudes of each of these parts do not conform with each other, and therefore would have been difficult to assemble conventionally. Thus, in the present invention, information for connecting the vertices of each of the polygons is prepared in advance. When the vertices of polygon 61 are set as E1 through E7, the vertices of polygon 62 are set as N1 through N6, and the vertices of polygon 62 are set as M1 through M7, as is illustrated in the figures, the vertex connection information is as follows. Note that (P, Q) means that vertex P and vertex Q are to be connected.

(E3, N1)
(E4, N6)
(E5, N5)
(N2, M1)
(N3, M7)
(N4, M6)

Here, if the distance [E3, E4] between vertex E3 and vertex E4 is compared with the distance [N1, N6] between vertex N1 and vertex N6, it is learned that, since the magnitude of polygon 61 and the magnitude of polygon 62 differ, these polygons do not match. Consequently, processing is required to enlarge or reduce the polygons and to linearly interpolate the texture fixed onto the surfaces of the polygons. If a case is considered in which the magnitude of polygon 62 is enlarged with the magnitude of polygon 61 as a reference, for example, and if $[E3, E4]/[N1, N6]=k_1$ and $[E4, E5]/[N6, N5]=k_2$, then processing is required to enlarge line segment N1N6 by $k_1$ and to enlarge line segment N6N5 by $k_2$. The enlargement ratios for line segment N2N3 and line segment N3N4 are determined in a similar manner with respect to the relationships thereof with line segment M1M7 and line segment M7M6.

Hence, when a first internally dividing point which internally divides the line segment N1N6, a second internally dividing point which internally divides the line segment N6N5, a third internally dividing point which internally divides the line segment N2N3, and a fourth internally dividing point which internally divides the line segment N3N4 have been established, the movement vectors for each of the points (internal points) in the interior of the polygon 62 can be determined from the distance ratio between these internal points and the first to fourth internally dividing points, and from the relationships between the movement vectors of each of the vertices N1 through N6. Upon completion of the enlargement conversion processing of the polygon 62, the texture which is fixed onto the surface thereof is linearly interpolated in order to fill the gaps between the internal points. Enlargement/reduction conversion processing is performed in a similar manner for polygon 63 by determining the movement vectors of the internal points from the movement vectors of each of the vertices M1 through M7 on the basis of the magnitude, shape and relative location of polygon 62. In so doing, the magnitudes of each of the polygons are corrected and the polygons are assembled, whereby a face montage such as that shown in FIG. 11 is obtained. When ear and head portion polygons are further assembled, a model expressing the personal appearance of a player character is completed. By means of morphing technology to cause the texture which is fixed onto the surface of the model to move continuously, richly expressive facial features may be obtained.

Thus, according to this embodiment, vertex connection information is prepared in advance for the polygons which constitute one part of the model, and as a result, even if the magnitudes and shapes of the polygons do not conform with each other, linear conversion processing of the polygons is performed on the basis of the vertex connection information such that the disconformities among the magnitudes and shapes of the polygons can be eliminated and a richly expressive model can be created using a small amount of data.

Note that the present invention is not limited to a soccer game and is applicable to any games in which a game player advances the game by constructing formations using a plurality of characters. Such games include various types of competitive team sports such as baseball, tennis, softball, soft tennis, rugby, American football, badminton, volleyball, basketball, hockey, handball, beach volleyball, sepak takraw, Indiaca, unihockey, and lacrosse, and military simulation games in which automatic deployment of weaponry, units of soldiers and the like occurs.

According to the present invention, optimum positioning is determined on the basis of character ability parameters, and therefore optimum positioning which is based on the base position and the abilities of a character becomes possible. Also according to the present invention, edit data can be saved on separate files, which is convenient as regards editing operations. Further, according to the present invention, even when the magnitudes and shapes of polygons do not conform with each other, vertex connection information concerning the polygons can be used to enlarge/reduce the polygons, whereby the magnitudes and shapes of the polygons can be aligned, as a result of which the amount of polygon data can be reduced.

What is claimed is:

1. A character deployment method for a game device that executes a program for a game in which each of a plurality of characters assumes a role corresponding to a position from among a plurality of positions divided into a plurality of groups on a field in a game display, the method comprising:

acquiring information indicating a formation selected by a player that performs input operations on the game device, the formation being selected from a plurality of formations that define a number of the characters deployed to each of the groups;

acquiring information that has been preset to indicate each character's ability to play an inherent role corresponding to a selected one of the positions; and deploying a first character, said first character having a higher ability corresponding to a first one of the groups from among the plurality of characters belonging to the first group prior to a formation change, to positions belonging to the first group by priority, and deploying a second character, said second character having a lower ability corresponding to the first group from among the plurality of characters belonging to the first group prior to the formation change, to positions belonging to a second one of the groups when the number of characters deployed to the first group prior to the formation change is greater than the number of characters defined by the selected formation, wherein the number of the characters deployed to each of the groups is predetermined depending on the selected formation, and the second group as a destination to which the second character moves is predetermined when the number of the characters deployed to the first group prior to the formation change is greater than the number of the characters defined by the selected formation.

2. The character deployment method of claim 1, wherein deploying a character further comprises a step of:

changing the deployment of at least one of the characters to a side of the game display corresponding to a dominant foot of the characters belonging to the same group.

3. A computer program program product in which a computer program is stored on a computer-readable medium for executing processing for placing a plurality of characters into respective positions in a game in which each of the plurality of characters assumes a role corresponding to the position from among a plurality of positions divided into a plurality of groups on a field in a game display, wherein the program causes a game device to execute:

acquiring information indicating a formation selected by a player that performs input operations on the game device, the formation being selected from a plurality of formations that define a number of the characters deployed to each of the groups;

acquiring information that has been preset to indicate each character's ability to play an inherent role corresponding to a selected one of the positions; and deploying a first character, said first character having a higher ability corresponding to a first one of the groups from among the plurality of characters belonging to the first group prior to a formation change, to positions belonging to the first group by priority, and deploying a second character, said second character having a lower ability corresponding to the first group from among the plurality of characters belonging to the first group prior to the formation change, to positions belonging to a second one of the groups when the number of characters deployed to the first group prior to the formation change is greater than the number of characters defined by the selected formation, wherein the number of the characters deployed to each of the groups is predetermined depending on the selected formation, and the second group as a destination to which the second character moves is predetermined when the number of the characters deployed to the first group prior to the formation chance is greater than the number of the characters defined by the selected formation.

4. The computer program product according to claim 3, wherein deploying a character further comprises a step of:

changing the deployment of at least one of the characters to a side of the game display corresponding to a dominant foot of the characters belonging to the same group.

* * * * *

UNITED STATES PATENT AND TRADEMARK OFFICE
CERTIFICATE OF CORRECTION

| | | |
|---|---|---|
| PATENT NO. | : 7,300,345 B2 | Page 1 of 1 |
| APPLICATION NO. | : 10/262948 | |
| DATED | : November 27, 2007 | |
| INVENTOR(S) | : Satoshi Mifune et al. | |

It is certified that error appears in the above-identified patent and that said Letters Patent is hereby corrected as shown below:

In claim 3, column 9, line 5, "computer program program product" should read --computer program product--.

In claim 3, column 10, line 14, "chance" should read --change--.

Signed and Sealed this

Fifth Day of August, 2008

JON W. DUDAS
*Director of the United States Patent and Trademark Office*